Aug. 8, 1961 D. P. COOPER, JR Re. 25,017

ELECTRIC LAMP

Original Filed March 3, 1955

INVENTOR

Dexter P. Cooper, Jr.

BY Brown and Mikulka

ATTORNEYS

United States Patent Office

Re. 25,017
Reissued Aug. 8, 1961

25,017
ELECTRIC LAMP

Dexter P. Cooper, Jr., Lexington, Mass., assignor to Polaroid Corporation, a corporation of Delaware Original No. 2,909,696, dated Oct. 20. 1959, Ser. No. 491,839, Mar. 3, 1955. Application for reissue Aug. 12, 1960, Ser. No. 49,813
9 Claims. (Cl. 313—221)

Matter enclosed in heavy brackets [ ] appears in the original patent but forms no part of this reissue specification; matter printed in italics indicates the additions made by reissue.

This invention relates to a new and improved electric lamp.

It is one object of the present invention to provide an electric lamp whose envelope comprises a polymeric plastic.

Another object is to provide an electric lamp having an inexpensive, relatively shatter-proof envelope.

A still further object is to provide an envelope for an electric lamp and comprising a polymeric plastic which will permit the enclosed area to be maintained relatively free of water vapor and other oxygen-containing gases and vapors in any substantial amount under operating conditions.

Other objects of the invention will in part be obvious and will in part appear hereinafter.

The invention accordingly comprises the product possessing the features, properties and the relation of elements which are exemplified in the following detailed disclosure and the scope of the application of which will be indicated in the claims.

Figure 1:
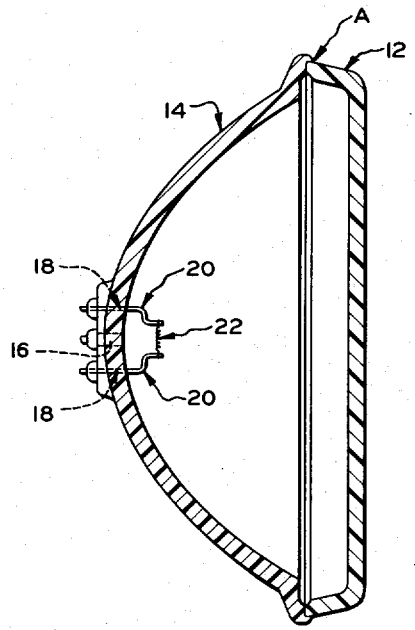
Figure 2:
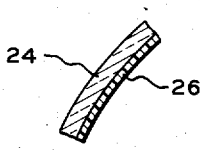

For a fuller understanding of the nature and objects of the invention, reference should be had to the following detailed description taken in connection with the accompanying drawings, wherein:

FIGURE 1 represents a sectional view of a typical automobile headlamp embodying the preferred materials and structure disclosed in this specification; and FIG. 2 represents a sectional view of a portion of the envelope of a similar lamp employing a second embodiment of the invention.

Practically all electric lamps manufactured today use a glass envelope and stem press. Glass adsorbs and absorbs gases, including oxygen and water vapor. In the manufacture of incandescent bulbs, steps are usually taken to eliminate as much of these adsorbed and absorbed gases as possible, but the present day processes are not always successful. As a result, any oxygen in the bulb atmosphere will attack the filament to form tungstem oxide. If any water vapor or other sources of hydrogen and oxygen are present in the bulb atmosphere, a cyclical process may occur, causing tungsten from the filament to be systematically deposited upon the inner wall of the envelope. This will cause bulb blackening, impairing the light output from the bulb. In addition, tungsten evaporates from the filament to maintain the proper equilibrium between the solid and vapor phases. Eventually, the filament may be eaten away and may fail.

In this invention, it is proposed that the lamp envelope comprise a relatively rigid polymeric plastic with a high softening point. The plastic material may comprise the entire envelope, or it may be deposited, by techniques well known in the art, upon the inner wall of an envelope made of some other material, such as glass. High softening point polymeric plastics selected from the class comprising vinyl and condensation polymers having a high degree of molecular order and having softening temperatures above approximately 80° C. may be used. A preferred material is polychlorotrifluoroethylene; other examples are polytetrafluoroethylene, copolymers of chlorotrifluoroethylene and tetrafluoroethylene, vinylidene chloride resins (sold under the trade name "Saran"), and polyethylene terephthalate.

It will be noted that such materials may be substantially transparent or translucent and substantially impervious to gases; they should have softening points above the highest temperatures to which the envelope of a properly designed lamp need be subjected. These materials neither adsorb nor absorb gases or water vapor to any significant degree; hence, once oxygen and water vapor are removed from the bulb by techniques of evacuation well known in the art, a negligible amount of tungsten will be deposited on the envelope during the operating life of the bulb and bulb blackening will be avoided. As a result, the life of the bulb is greatly extended.

The plastics mentioned above are relatively easy to work with. They may be molded into the desired shapes at relatively low temperatures; thus processing personnel are not subjected to unpleasantly warm working conditions. Since these materials do not possess the brittle qualities of some other materials, such as glass, they provide an inherent shock mounting for the filament and leads of the bulb; other materials necessary to the operation of the bulb may be selected for optimum efficiency with little regard for their coefficients of thermal expansion.

Many materials in the designated class may be prepared in a translucent form, by techniques well known in the art, to give a frosted effect, if desired. Dyes may be incorporated within the material at some stage of the manufacturing process, if a colored light is desired.

These materials may also be used successfully in gaseous-discharge illuminating bulbs or tubes and in other lighting devices. In particular, this invention may be advantageously employed in the manufacture of bulbs, such as sealed-beam automobile headlights, in which relatively high resistance to shock and vibration is desirable.

For the preferred embodiment of this invention, shown in FIGURE 1, polychlorotrifluoroethylene, in the form of a molding powder, is used as a starting material. The lens portion 12 and the reflector portion 14 of the envelope may be fashioned in separate operations, with the molds having dimensions such that the reflector portion may be force-fitted into the lens portion. The reflector portion may include the exhaust tube 16 as an integral part, and the lead wires 18, which may be of any suitable electrically conductive material, may be embedded in the reflector portion during the molding operation. The reflector portion may be adapted, by way of a suitable mold, to fit the desired power-supplying receptacle; this procedure will permit the use of a metal strip electrical contact with the power source, and permit a saving of metal over present day processes.

The support wires 20 and the filament 22, as well as a fuse, if desired, may be inserted in accordance with procedures well known in the art. A zirconium or other getter may be used, although tests indicate that it is usually not necessary.

When the filament and supporting elements are properly inserted and positioned, the reflector portion may be cemented or clamped to the lens portion by techniques well known in the art. Tests indicate that an envelope comprising polychlorotrifluoroethylene will provide a suitably airtight device if the components are force-fitted together, employing, for example, an interlocking lip configuration to maintain tight contact. An example of such a configuration is shown at point A of the drawing.

The bulb may then be evacuated and, if desired, filled with any suitable gas or mixture of gases, such as nitrogen and argon. Further processing of the bulb may be done in accordance with techniques well known in the art. It will be noted that some of the polymeric plastics mentioned have high electrical resistances; their use obviates the need for any other insulating material around sub-leads and contacts.

It may be desirable to coat the inner wall of a glass envelope with a plastic of the described class. This embodiment is shown in FIG. 2, wherein 24 represents a glass outer wall having a coating 26 comprising a plastic of the described class. It is to be noted that in this embodiment, the plastic need not itself be rigid, so long as it will adhere to the glass wall to which it is applied.

If a reflector is desired, such as in a sealed-beam automobile headlight, aluminum, for example, may be evaporated upon the inner wall of the desired reflecting portion of the envelope, or a bright-metal reflector may be properly positioned where desired outside the envelope wall.

It should be noted that the term "envelope," as used herein, refers to all or any portion of the substantially rigid, airtight container enclosing the filament.

Since certain changes may be made in the above product without departing from the scope of the invention herein involved, it is intended that all matter contained in the above description or shown in the accompanying drawings shall be interpreted as illustrative and not in a limiting sense. In particular, although the product of this invention is applicable to automobile headlamps, it is not intended that the scope of the invention be so limited.

What is claimed is:

1. A single-envelope incandescent electric lamp comprising, in combination, a filament, electrically conductive leads [supporting said filament and] operatively attached thereto, a [light-transmitting] gas-tight envelope completely surrounding said filament and constituting the single envelope for said lamp, at least the inner face of said envelope comprising a substantially rigid [light-transmitting] polymeric plastic from the class consisting of the vinyl and condensation polymers having a high degree of molecular order and having a softening temperature above approximately 80° C., *at least a portion of said envelope and said inner face being light transmissive,* and an atmosphere within said envelope substantially completely free of detectable water vapor and oxygen.

2. A lamp according to claim 1, wherein said envelope also comprises a glass outer portion substantially completely enclosing said inner face.

3. A lamp according to claim 1, wherein the polymeric plastic comprises polychlorotrifluoroethylene.

4. A lamp according to claim 1, wherein the polymeric plastic comprises polytetrafluoroethylene.

5. A lamp according to claim 1, wherein the polymeric plastic comprises polyethylene terephthalate.

6. A lamp according to claim 1, wherein the polymeric plastic comprises a copolymer of chlorotrifluoroethylene and tetrafluoroethylene.

7. A lamp according to claim 1, wherein the polymeric plastic comprises a vinylidene chloride resin.

8. A lamp according to claim 1, wherein the polymeric plastic material comprises a polymerized halogenated hydrocarbon.

*9. A single-envelope incandescent electric lamp comprising, in combination, a filament, electrically conductive leads operatively attached thereto, a gas-tight envelope completely surrounding said filament and constituting the single envelope for said lamp, said envelope consisting entirely of a substantially rigid polymeric plastic from the class consisting of the vinyl and condensation polymers having a high degree of molecular order and having a softening temperature above approximately 80° C., at least a portion of said envelope being light-transmissive, and an atmosphere within said envelope substantially completely free of detectable water vapor and oxygen.*

References Cited in the file of this patent or the original patent

UNITED STATES PATENTS

| | | |
|---|---|---|
| 2,574,000 | Victoreen | Nov. 6, 1951 |
| 2,599,644 | Keukens | June 10, 1952 |
| 2,606,586 | Hill | Aug. 12, 1952 |
| 2,644,113 | Etzkorn | June 30, 1953 |